United States Patent
Schmitt et al.

(10) Patent No.: US 10,075,119 B2
(45) Date of Patent: Sep. 11, 2018

(54) THREE LEVEL INVERTER MIDPOINT CONTROL GAIN CORRECTION

(71) Applicant: Hamilton Sundstrand Corporation, Charlotte, NC (US)

(72) Inventors: Dwight D. Schmitt, Rockford, IL (US); Curtis J. Plude, Belvidere, IL (US); Adam Michael White, Cherry Valley, IL (US); John Duward Sagona, Poplar Grove, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 65 days.

(21) Appl. No.: 15/243,010

(22) Filed: Aug. 22, 2016

(65) Prior Publication Data
US 2018/0054150 A1 Feb. 22, 2018

(51) Int. Cl.
| | |
|---|---|
| H02H 7/08 | (2006.01) |
| H02P 27/06 | (2006.01) |
| H02P 27/14 | (2006.01) |
| H02M 7/483 | (2007.01) |
| H02M 7/487 | (2007.01) |

(52) U.S. Cl.
CPC ............ *H02P 27/06* (2013.01); *H02M 7/483* (2013.01); *H02M 7/487* (2013.01); *H02P 27/14* (2013.01)

(58) Field of Classification Search
CPC .................................................. H02H 7/0851
USPC .................................................... 318/445, 34
See application file for complete search history.

(56) References Cited

U.S. PATENT DOCUMENTS

| | | | | |
|---|---|---|---|---|
| 5,321,599 A | * | 6/1994 | Tanamachi | H02M 7/487 318/811 |
| 5,361,196 A | * | 11/1994 | Tanamachi | B60L 9/22 318/811 |
| 7,688,604 B2 | * | 3/2010 | Oyobe | B60L 11/18 318/34 |
| 7,986,538 B2 | | 7/2011 | Harke | |
| 9,030,854 B2 | | 5/2015 | Escobar et al. | |
| 2015/0100139 A1 | | 4/2015 | White | |
| 2016/0139578 A1 | | 5/2016 | Hasler et al. | |

FOREIGN PATENT DOCUMENTS

| | | |
|---|---|---|
| CN | 101753044 A | 6/2010 |
| CN | 102035423 A | 4/2011 |
| EP | 2720339 A | 4/2014 |

OTHER PUBLICATIONS

Extended European Search Report for International Application No. 17187253.4 dated Jan. 29, 2018, 9 pages.

* cited by examiner

*Primary Examiner* — David S Luo
(74) *Attorney, Agent, or Firm* — Cantor Colburn LLP

(57) ABSTRACT

A system and method for controlling a DC midpoint terminal voltage of a three level inverter is provided. The method includes receiving an input power signal at a three level motor controller system that includes a three level inverter, measuring, using a current sensor in the three level motor controller system, a DC current of the input power signal before the input power signal is provided to the three level inverter, and adjusting a zero-sequence inverter output voltage to adjust a midpoint voltage at the DC midpoint based on the measured DC current.

16 Claims, 5 Drawing Sheets

THREE LEVEL INVERTER MIDPOINT CONTROL GAIN CORRECTION

BACKGROUND

The subject matter disclosed herein generally relates to a three level inverter midpoint and, more particularly, to controlling voltage at the DC midpoint of the three level inverter.

Three level inverters have a DC midpoint terminal in addition to a DC positive and a DC negative terminal. Because of the particular arrangement of the DC midpoint, the DC midpoint node voltage is not controlled by a power source. Therefore, the DC midpoint node voltage can move relative to ground. This imbalance is minimized in order to maintain output current power quality and limit insulated-gate bipolar transistor (IGBT) and DC capacitor voltage stress.

Therefore, one or more methods and system elements have been developed to control the DC midpoint voltage. For example, one method of controlling the DC midpoint voltage of a three-level inverter is to utilize a PI regulator. Specifically, the input to the PI regulator is the error in the DC midpoint voltage. A zero-sequence voltage, proportional to the PI regulator output, is applied on the inverter output to reduce the error in the DC midpoint voltage. This loop gain increases as the output power of the inverter increases. Consequently the system may grow unstable at different operating points.

Accordingly for at least the above discussed reasons, as well as others, there is a desire to provide improved control methods for a three level inverter DC midpoint voltage.

BRIEF DESCRIPTION

According to one embodiment a method of balancing a DC midpoint of a three level inverter is provided. The method includes receiving an input power signal at a three level motor controller system that includes a three level inverter, measuring, using a current sensor in the three level motor controller system, a DC current of the input power signal before the input power signal is provided to the three level inverter, and adjusting a zero-sequence inverter output voltage to adjust a midpoint voltage at the DC midpoint based on the measured DC current.

In addition to one or more of the features described above, or as an alternative, further embodiments may include receiving the input power signal at the three-level inverter, and outputting an output power signal processed by the three level inverter, wherein the output power signal is an inverter power flow.

In addition to one or more of the features described above, or as an alternative, further embodiments may include, wherein the input power signal is a DC power signal with a constant voltage from a power source, and wherein the output power signal is an AC power signal provided to a load device.

In addition to one or more of the features described above, or as an alternative, further embodiments may include, wherein adjusting the zero-sequence inverter output voltage from the three level inverter to adjust the midpoint voltage based on the measured DC current further includes applying the zero-sequence inverter output voltage, wherein the zero-sequence inverter output voltage for a given midpoint voltage feedback is proportional to the inverse of the DC current when the DC current exceeds a minimum threshold.

In addition to one or more of the features described above, or as an alternative, further embodiments may include, wherein the midpoint voltage is equal to one-half of the difference between the voltage across an upper DC link capacitor (VUP) and the voltage across a lower DC link capacitor (VDN).

In addition to one or more of the features described above, or as an alternative, further embodiments may include, wherein a DC link voltage of the input power signal is constant.

In addition to one or more of the features described above, or as an alternative, further embodiments may include, wherein the output power signal is proportional to the measured DC current.

In addition to one or more of the features described above, or as an alternative, further embodiments may include, wherein adjusting the zero-sequence inverter output voltage from the three level inverter to adjust the midpoint voltage based on the measured DC current further includes setting a desired midpoint unbalanced value to zero volts, calculating a first temporary value by subtracting a DC midpoint unbalanced value from the desired midpoint unbalanced value, wherein the DC midpoint unbalanced value is equal to VUP minus VDN, divided by two, inverting the measured DC current, generating a second temporary value by multiplying the first temporary value by the inverted DC current, generating, using a regulator transfer function (C(s)), a commanded zero sequence inverter output voltage (VO*) based on the second temporary value, and applying the commanded zero sequence voltage to the three level inverter with open loop gain G(s), resulting in alteration of the DC midpoint voltage.

In addition to one or more of the features described above, or as an alternative, further embodiments may include, wherein the open loop gain (G(s)) increases linearly with power, wherein the inverted DC current decreases linearly with power, and wherein combining the G(s) and the inverted DC current maintains a loop gain that is constant over power.

In addition to one or more of the features described above, or as an alternative, further embodiments may include, wherein inverting the measured DC current further includes determining if the inverted DC current is below a minimum value, and adjusting the inverted DC current value to equal the minimum value if the inverted DC current is determined to be below the minimum value.

According to another embodiment, a three level motor controller system for balancing a DC midpoint of a three level inverter is provided. The three level motor controller system includes a DC current sensor connected in series between input ports of the three level motor controller system and the three level inverter, wherein the DC current sensor measures a DC current of an input power signal after the input power signal is received and before the input power signal is provided to the three level inverter, and the three level inverter that includes input terminals, a DC midpoint at the input terminals, and output terminals, wherein the three level inverter is connected to the input ports, the DC current sensor, and output ports of the three level motor controller system using an upper rail and a lower rail, and wherein the three level inverter adjusts a zero-sequence voltage output that adjusts a midpoint voltage at the DC midpoint based on the measured DC current.

In addition to one or more of the features described above, or as an alternative, further embodiments may include, a first filtering element connected between a DC power source and DC link capacitors of the three-level inverter.

In addition to one or more of the features described above, or as an alternative, further embodiments may include, a second filtering element connected between AC output terminals of the three level inverter and an AC load.

According to another embodiment, a computer program product for balancing a DC midpoint of a three level inverter in a three level motor controller system is provided. The computer program product including a computer readable storage medium having program instructions embodied therewith, the program instructions executable by a processor and the system to cause the system and processor to instruct, using the processor, a power source to provide an input power signal to the three level motor controller system, receive the input power signal at the three level motor controller system that includes a three level inverter, measure, using a current sensor in the three level motor controller system, a DC current of the input power signal after the input power signal is received and before the input power signal is provided to the three level inverter, and adjust a zero-sequence inverter output voltage from the three level inverter to adjust a midpoint voltage at the DC midpoint based on the measured DC current.

In addition to one or more of the features described above, or as an alternative, further embodiments may include, additional program instructions executable by the processor and the system to cause the system and processor to receive the input power signal at the three level inverter, and output an output power signal processed by the three level inverter, wherein the input power signal is a DC signal with a constant voltage from a power source, and wherein the output power signal is an AC signal provided to a load device.

In addition to one or more of the features described above, or as an alternative, further embodiments may include, additional program instructions executable by the processor and the system to cause the system and processor to adjust a proportion between a DC voltage between the DC midpoint and an upper rail connected to the three level inverter (VUP) and adjust a DC voltage between the DC midpoint and a lower rail connected to the three level inverter (VDN).

In addition to one or more of the features described above, or as an alternative, further embodiments may include, additional program instructions executable by the processor and the system to cause the system and processor to set a desired midpoint unbalanced value to zero volts, calculate a first temporary value by subtracting a DC midpoint unbalanced value from the desired midpoint unbalanced value, wherein the DC midpoint unbalanced value is equal to VUP minus VDN, divided by two, invert the measured DC current, generate a second temporary value by multiplying the first temporary value by the inverted DC current, generate, using a regulator transfer function (C(s)), a commanded zero sequence voltage (VO*) based on the second temporary value, and apply the zero sequence inverter output voltage to the inverter with open loop gain G(s), resulting in alteration of the DC midpoint unbalanced value.

In addition to one or more of the features described above, or as an alternative, further embodiments may include, additional program instructions executable by the processor and the system to cause the system and processor to maintain a loop gain that is constant over power, calculate an inverted DC current that decreases linearly with power, apply a value of the inverted DC current as a contribution to a controller loop gain, wherein combining loop gain contribution of G(s) and loop gain contribution of the inverted DC current maintains a net loop gain that is constant for varying power.

In addition to one or more of the features described above, or as an alternative, further embodiments may include, additional program instructions executable by the processor and the system to cause the system and processor to determine if the inverted DC current is below a minimum value, and adjust the inverted DC current value to equal the minimum value if the inverted DC current is determined to be below the minimum value.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
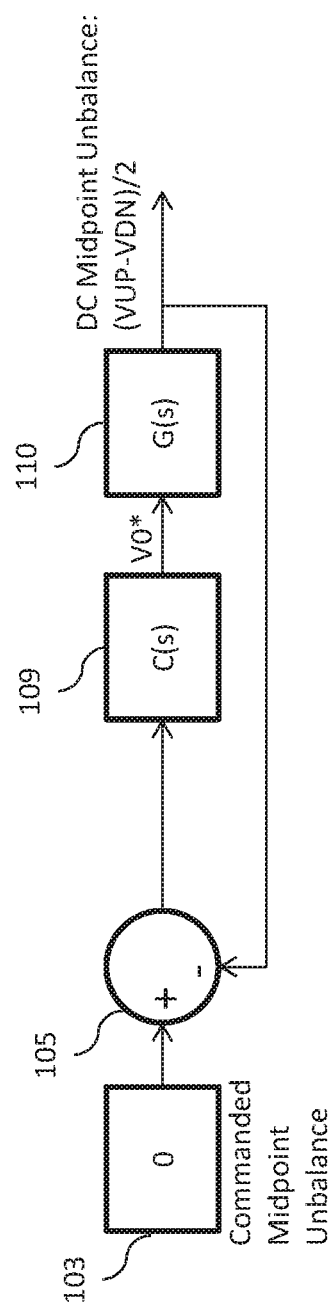
FIG. 1 depicts a schematic block diagram of three-level inverter DC midpoint control system.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to utilizing a DC current sensor in order to compensate for loop gain change as a function of power. Because the DC link voltage is generally constant as load is increased, the output power is proportional to the DC current measurement. For example, according to one or more embodiments, control method for a three level inverter DC midpoint voltage is provided by maintaining loop gain to be approximately constant as output power varies.

Turning now to the figures, FIG. 1 depicts a schematic block diagram of a three-level inverter DC midpoint control system.

The diagram initially shows a setting of a desired midpoint unbalanced value to zero volts (103). Next the processing flow of the system includes calculating a first temporary error value by subtracting a DC midpoint unbalanced value from the desired midpoint unbalanced value (105). Further, the DC midpoint unbalanced value is equal to VUP minus VDN, divided by two. The processing flow further includes generating, using a regulator transfer function (C(s)), a commanded zero sequence voltage (VO*) based on the first temporary value (109). Finally, the processing flow of the system includes the open loop dynamics (G(s)) between the commanded zero sequence voltage (VO*) and the DC midpoint unbalanced value (110).

Figure 2:
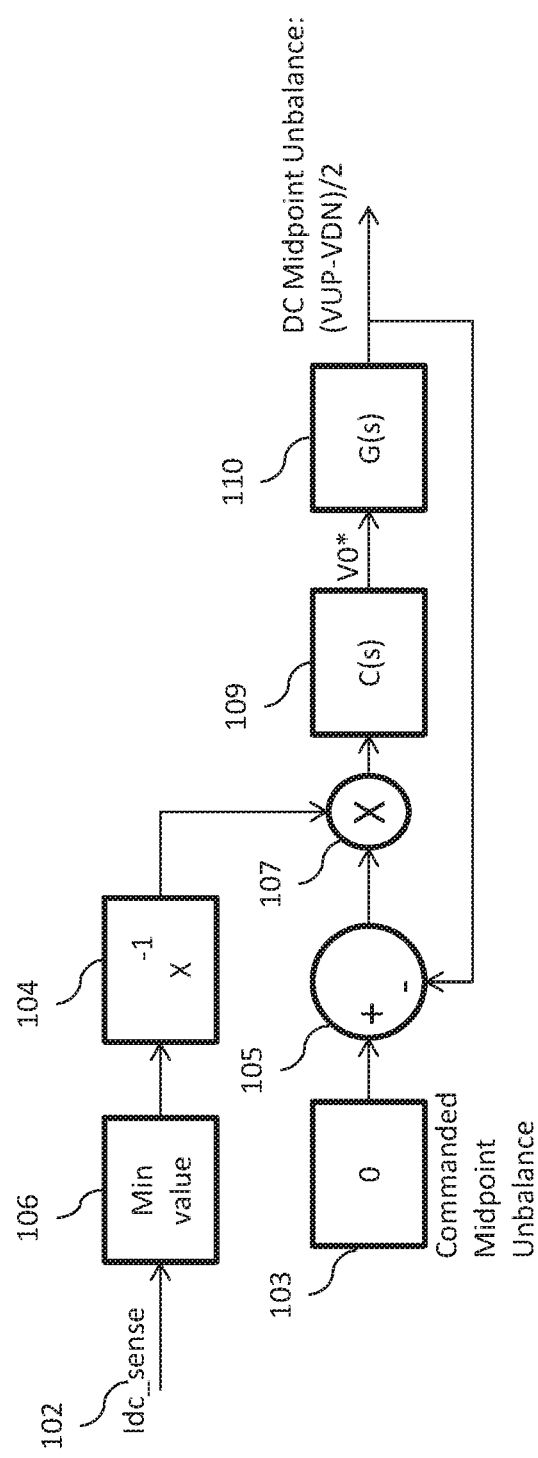
FIG. 2 depicts a schematic block diagram of a three-level inverter DC midpoint control system in accordance with one or more embodiments.

FIG. 2 depicts a schematic block diagram of three-level inverter DC midpoint control system in accordance with one or more embodiments of the present disclosure.

Similar to FIG. 1, the diagram in FIG. 2 initially shows a setting of a desired midpoint unbalanced value to zero volts (103). Next the processing flow of the system includes calculating a first temporary error value by subtracting a DC midpoint unbalanced value from the desired midpoint unbalanced value (105). Further, the DC midpoint unbalanced value is equal to VUP minus VDN, divided by two. According to other embodiments, the processing flow further includes generating, using a regulator transfer function (C(s)), a commanded zero sequence voltage (VO*) based on a second temporary value (109). Finally, the processing flow of the system includes the inherent open loop gain (G(s)) between the commanded zero sequence voltage (VO*) and the DC midpoint unbalanced value (110).

Further, in contrast to FIG. 1 and in accordance with one or more embodiments, the diagram also shows the system receiving a measured DC current (Idc_sense) from a current sensor (102). Also, the system determines if the inverted DC current is below a minimum value, and adjusts the inverted DC current value equal the minimum value if the inverted DC current is determined to be below the minimum value (106). Additionally, the system uses a processing element to invert the measured DC current (104).

Figure 3:
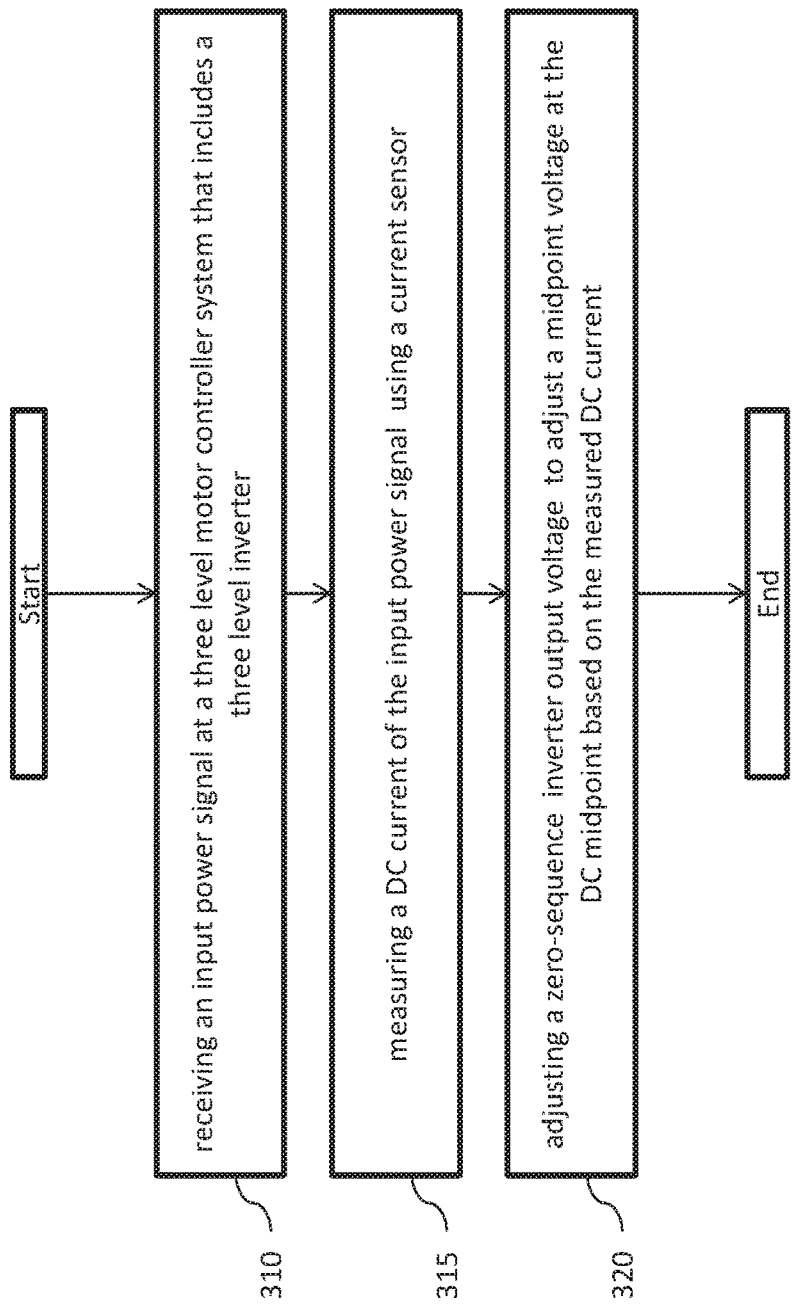
FIG. 3 is a flowchart of a method of balancing a DC midpoint of a three level inverter in accordance with one or more embodiments.

This system then generates the second temporary value by multiplying the first temporary value by the inverted and value limited DC current (107). The open loop gain (G(s)) increases linearly with power. In contrast, the inverted DC current decreases linearly with power. Accordingly, combining the G(s) and the inverted DC current maintains a loop gain that is constant over power FIG. 3 is a flowchart of a method of balancing a DC midpoint of a three level inverter in accordance with one or more embodiments of the present disclosure. The method includes receiving an input power signal at a three level motor controller system that includes a three level inverter (operation 310). Further, the method includes measuring, using a current sensor in the three level motor controller system, a DC current of the input power signal. This measurement is done on a front end before the power signal is passed through and adjusted by any of the elements in the system. For example, the measurement is done when the input power signal is received by the three-level motor controller system. Specifically, the measurement is done before the input power signal is provided to the three level inverter or any of the other elements of the system (operation 315). Finally, the method includes adjusting a zero-sequence voltage output which in turn has the effect of adjusting a midpoint voltage at the DC midpoint. This adjustment is done based on the measured DC current (operation 320).

According to other embodiments, the method can further include receiving the input power signal at the three-level inverter and providing an output power signal processed by the three-level inverter. Further, according to an embodiment the input power signal is a DC signal with a constant voltage from a power source, and wherein the output power signal is an AC signal provided to a load device.

According to other embodiments, midpoint voltage is adjusted by applying a zero-sequence voltage (VO*). The applied zero-sequence voltage for a given midpoint voltage feedback is proportional to the inverse of DC link current when the DC link current exceeds a minimum threshold. The control loop brings the average midpoint voltage imbalance to a zero time-averaged value and thereby causes VUP and VDN to have equal time-average values. Further, according to an embodiment, the current sensor is a current transducer. According to other embodiments, the inverter DC link voltage is constant and inverter power flow is proportional to the measured DC current.

According to one or more embodiments, the method can further include determining if the inverted DC current is below a minimum value, and adjusting the inverted DC current value to equal the minimum value if the inverted DC current is determined to be below the minimum value.

Figure 4:
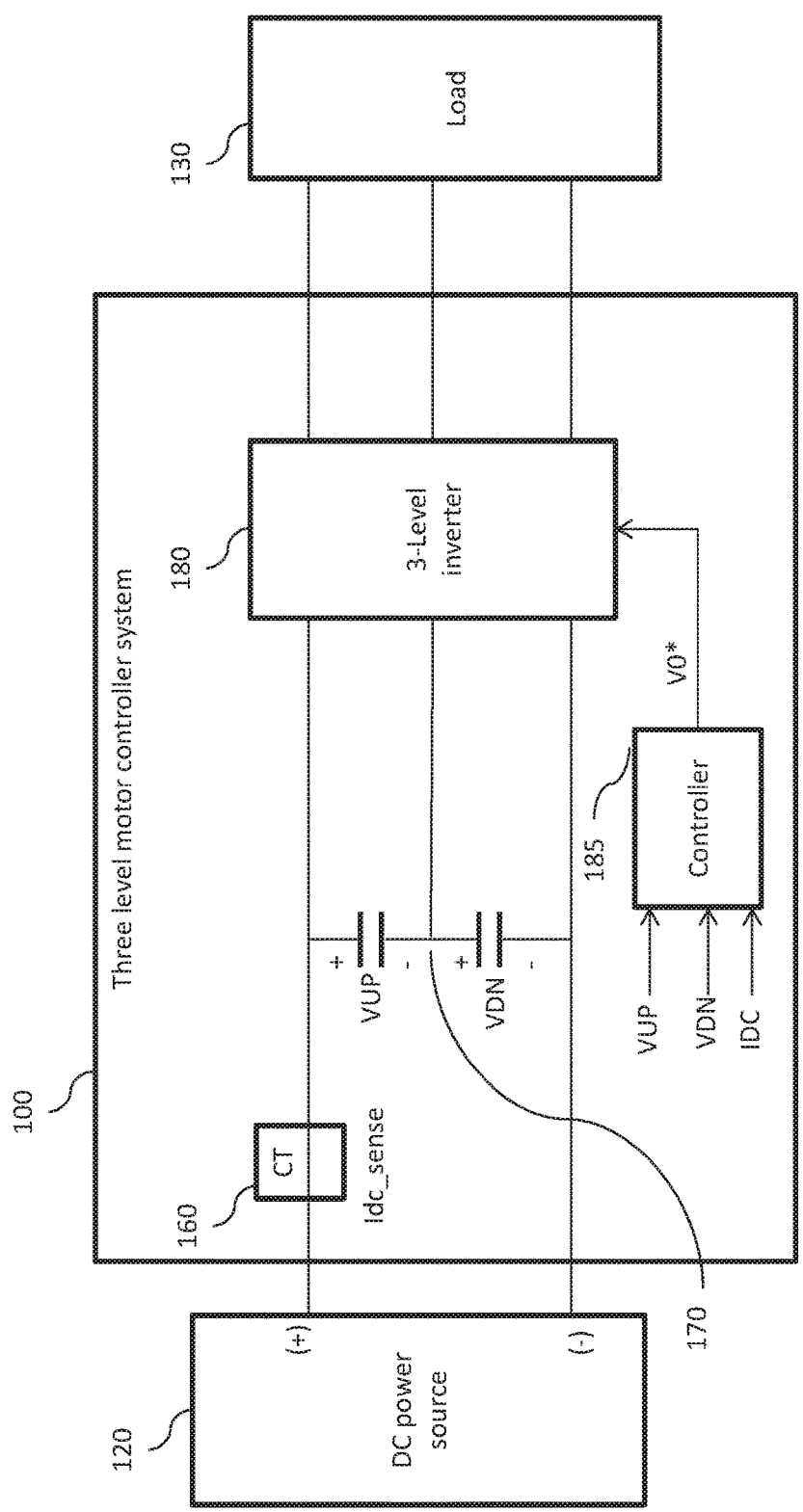
FIG. 4 is a block diagram of a three level motor controller system for balancing a DC midpoint of a three level inverter in accordance with one or more embodiments.

FIG. 4 is a block diagram of a three level motor controller system 100 for balancing a DC midpoint 170 of a three level inverter 180 in accordance with one or more embodiments of the present disclosure. The three level motor controller system 100 includes a DC current sensor 160 connected in series between input ports of the three level motor controller system 100 and the three level inverter 180. The DC current sensor 160 measures a DC current of an input power signal after the input power signal is received and before the input power signal is provided to the DC link capacitors associated with the three-level inverter 180. The three-level inverter 180 includes DC input terminals, one of them, a DC midpoint 170 at the input terminals, and AC output terminals.

According to one or more embodiments, a controller 185 adjusts a zero-sequence voltage output that adjusts a midpoint voltage at the DC midpoint 170 based on the measured DC current.

Figure 5:
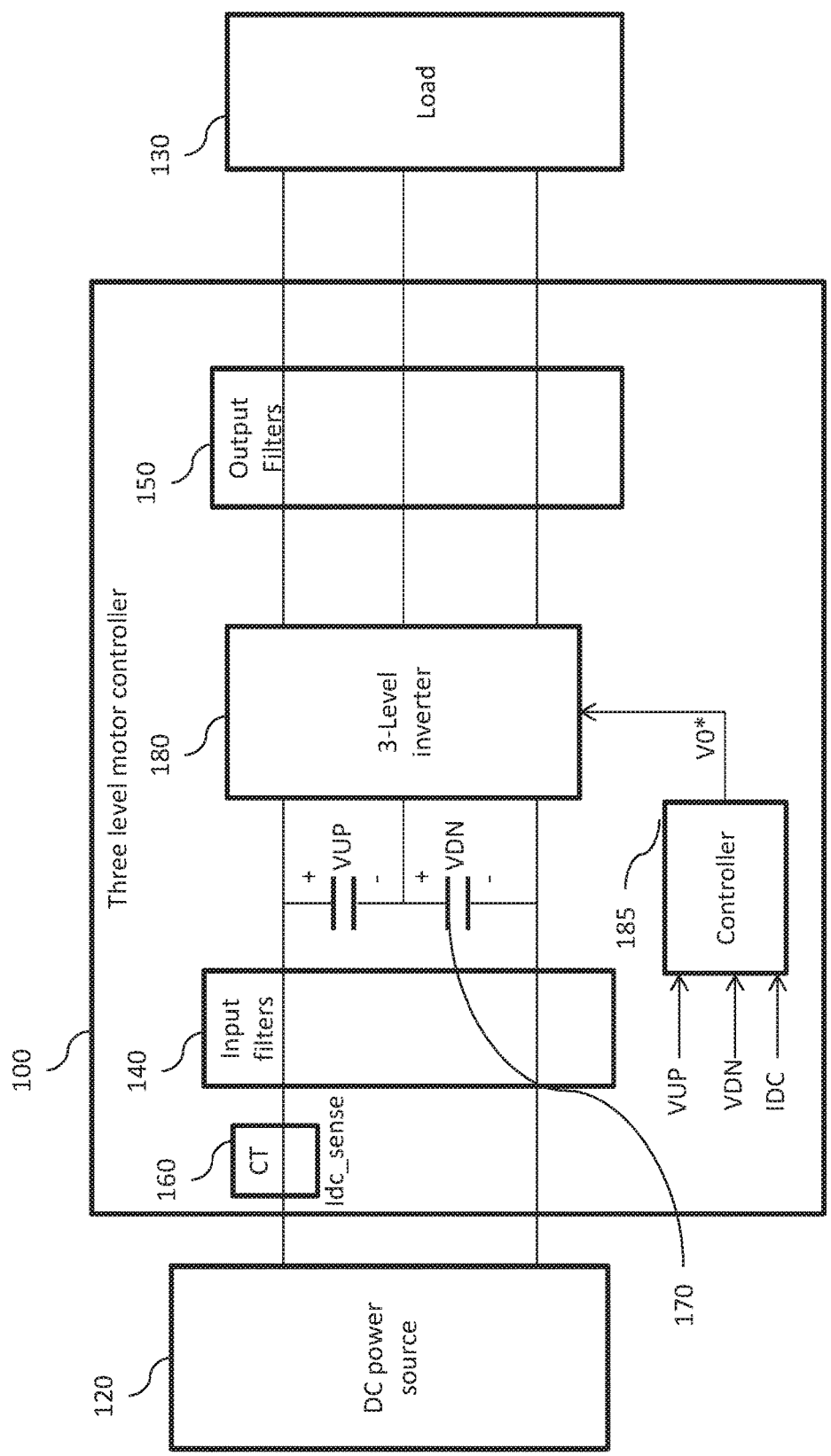
FIG. 5 is a block diagram of a three level motor controller system for balancing a DC midpoint of a three level inverter in accordance with one or more embodiments.

FIG. 5 is a block diagram of a three level motor controller system for balancing a DC midpoint of a three level inverter in accordance with one or more embodiments of the present disclosure.

Particularly, similar to FIG. 4, FIG. 5 as shown includes the three level motor controller system 100 that includes a DC current sensor 160 connected in series between input ports of the three level motor controller system 100 and the three level inverter 180. The DC current sensor 160 measures a DC current of an input power signal after the input power signal is received and before the input power signal is provided to the DC link capacitors associated with the three-level inverter 180. The three-level inverter 180 includes DC input terminals, a DC midpoint 170 at the input terminals, and AC output terminals. According to one or more embodiments, the three-level inverter 180 is connected to the input terminals and the DC current sensor 160 and output terminals of the three-level motor controller system 100 using an upper rail and a lower rail. According to one or more embodiments, a controller 185 adjusts a zero-sequence voltage (V0*) output that adjusts a midpoint voltage at the DC midpoint 170 based on the measured DC current.

Further, according to other embodiments, the three level motor controller 100 includes a first filter 140 that can also be called input filters 140. The input filters 140 include one or more signal filters. Further, the three level motor controller 100 also includes a second filter that can also be called output filters 150.

Advantageously, embodiments described herein provide using a single measurement (DC current) for loop gain compensation which can reduce computation requirement, reduce complexity, and reduce error.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, in accordance with an exemplary embodiment, the PI regulator, C(s), and proportional gain can be varied during operation in order to maintain the overall loop gain approximately constant. This may be referred to as gain scheduling. The current disclosure utilizes a DC current sensor in order to compensate for loop gain change as a function of power. Since the DC link voltage is generally constant as load is increased, the output power is proportional to the DC current measurement. It will also be appreciated that control structures other than PI may be used for C(s), while still utilizing the same compensation scheme using the DC current.

Further, in accordance with one or more embodiments, G(s) gain increases linearly with power, and 1/Idc_sense decreases linearly with power, thus maintaining the loop gain approximately constant over power. The $x^{-1}$ operation inverts the DC current sense signal prior to the multiply operation, thus the loop gain is divided by the Idc_sense signal. To prevent dividing by zero at low power load and no DC current, the value of Idc_sense is maintained at a minimum value, as depicted in the "min value" block. In practice, G(s) gain can be near zero at no load, and thus the system will have near zero net loop gain at no load. This is not problematic, however, since the magnitude of DC midpoint unbalance will be approximately zero at no load. The magnitude of DC midpoint unbalance for a given non-zero fundamental AC output frequency increases with power.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of balancing a DC midpoint of a three level inverter, the method comprising:
receiving an input power signal at a three level motor controller system that includes a three level inverter;
measuring, using a current sensor in the three level motor controller system, a DC current of the input power signal before the input power signal is provided to the three level inverter; and
adjusting a zero-sequence inverter output voltage to adjust a midpoint voltage at the DC midpoint based on the measured DC current;
wherein adjusting the zero-sequence inverter output voltage from the three level inverter to adjust the midpoint voltage based on the measured DC current further comprises:
applying the zero-sequence inverter output voltage, wherein the zero-sequence inverter output voltage for a given midpoint voltage feedback is proportional to the inverse of the DC current when the DC current exceeds a minimum threshold.

2. The method of claim 1, further comprising:
receiving the input power signal at the three level inverter; and
outputting an output power signal processed by the three-level inverter, wherein the output power signal is an inverter power flow.

3. The method of claim 2,
wherein the input power signal is a DC power signal with a constant voltage from a power source, and
wherein the output power signal is an AC power signal provided to a load device.

4. The method of claim 1, wherein the midpoint voltage is equal to one-half of the difference between the voltage across an upper DC link capacitor (VUP) and the voltage across a lower DC link capacitor (VDN).

5. The method of claim 1, wherein a DC link voltage of the input power signal is constant.

6. The method of claim 1, wherein the output power signal is proportional to the measured DC current.

7. The method of claim 1, wherein adjusting the zero-sequence inverter output voltage from the three level inverter to adjust the midpoint voltage based on the measured DC current further comprises:
setting a desired midpoint unbalanced value to zero volts;
calculating a first temporary value by subtracting a DC midpoint unbalanced value from the desired midpoint unbalanced value, wherein the DC midpoint unbalanced value is equal to VUP minus VDN, divided by two;
inverting the measured DC current;
generating a second temporary value by multiplying the first temporary value by the inverted DC current;
generating, using a regulator transfer function (C(s)), a commanded zero sequence inverter output voltage (VO*) based on the second temporary value; and
applying the commanded zero sequence inverter output voltage to the three level inverter with open loop gain G(s), resulting in alteration of the DC midpoint voltage.

8. The method of claim 7,
wherein the open loop gain (G(s)) increases linearly with power,
wherein the inverted DC current decreases linearly with power, and wherein combining the G(s) and the inverted DC current maintains a loop gain that is constant over power.

9. The method of claim 7, wherein inverting the measured DC current further comprises:
determining if the inverted DC current is below a minimum value, and
adjusting the inverted DC current value to equal the minimum value if the inverted DC current is determined to be below the minimum value.

10. A three level motor controller system for balancing a DC midpoint of a three level inverter, the three level motor controller system comprising:
a DC current sensor connected in series between input ports of the three level motor controller system and the three level inverter,
wherein the DC current sensor measures a DC current of an input power signal after the input power signal is received and before the input power signal is provided to the three level inverter;
the three level inverter that includes input terminals, a DC midpoint at the input terminals, and output terminals,
wherein the three level inverter is connected to the input ports, the DC current sensor, and output ports of the three level motor controller system using an upper rail and a lower rail, and
wherein the three level inverter adjusts a zero-sequence inverter output voltage output that adjusts a midpoint voltage at the DC midpoint based on the measured DC current; and
a first filtering element connected between a DC power source and DC link capacitors of the three level inverter.

11. The system of claim 10, further comprising:
a second filtering element connected between AC output terminals of the three level inverter and an AC load.

12. A computer program product for balancing a DC midpoint of a three level inverter in a three level motor controller system, the computer program product comprising a computer readable storage medium having program instructions embodied therewith, the program instructions executable by a processor and the system to cause the system and processor to:
instruct, using the processor, a power source to provide an input power signal to the three level motor controller system;
receive the input power signal at the three-level motor controller system that includes a three level inverter;
measure, using a current sensor in the three level motor controller system, a DC current of the input power signal after the input power signal is received and before the input power signal is provided to the three level inverter;
adjust a zero-sequence inverter output voltage from the three level inverter to adjust a midpoint voltage at the DC midpoint based on the measured DC current;
adjust a proportion between a DC voltage between the DC midpoint and an upper rail connected to the three level inverter (VUP); and
adjust a DC voltage between the DC midpoint and a lower rail connected to the three level inverter (VDN).

13. The computer program product of claim 12 further comprising additional program instructions executable by the processor and the system to cause the system and processor to:
receive the input power signal at the three level inverter; and output an output power signal processed by the three level inverter, wherein the input power signal is a DC signal with a constant voltage from a power source, and wherein the output power signal is an AC signal provided to a load device.

14. The computer program of claim 12 product further comprising additional program instructions executable by the processor and the system to cause the system and processor to:

set a desired midpoint unbalanced value to zero volts;

calculate a first temporary value by subtracting a DC midpoint unbalanced value from the desired midpoint unbalanced value, wherein the DC midpoint unbalanced value is equal to VUP minus VDN divided by two;

invert the measured DC current;

generate a second temporary value by multiplying the first temporary value by the inverted DC current; and generate, using a regulator transfer function (C(s)), a commanded zero sequence inverter output voltage (VO*) based on the second temporary value; and apply the zero sequence inverter output voltage to an inverter with open loop gain G(s), resulting in alteration of the DC midpoint unbalanced value.

15. The computer program product of claim 14 further comprising additional program instructions executable by the processor and the system to cause the system and processor to:

maintain a loop gain that is constant over power;

calculate an inverted DC current that decreases linearly with power; and apply a value of the inverted DC current as a contribution to a controller loop gain, wherein combining loop gain contribution of G(s) and loop gain contribution of the inverted DC current maintains a net loop gain that is constant for varying power.

16. The computer program product of claim 14 further comprising additional program instructions executable by the processor and the system to cause the system and processor to:

determine if the inverted DC current is below a minimum value, and adjust the inverted DC current value to equal the minimum value if the inverted DC current is determined to be below the minimum value.

* * * * *